C. A. L. GEHRMANN.
MOTION PICTURE APPARATUS.
APPLICATION FILED MAR. 16, 1917.
1,321,906.    Patented Nov. 18, 1919.
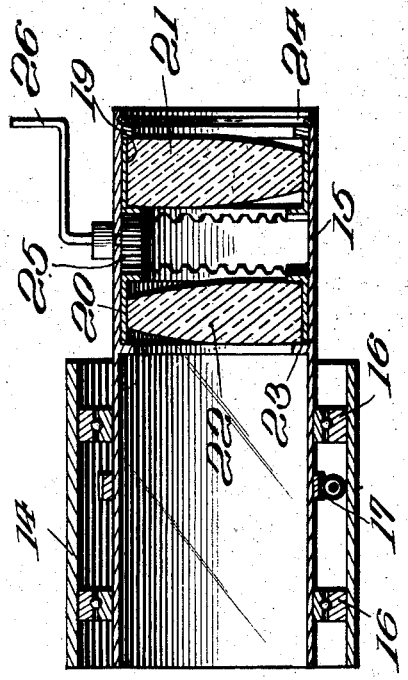
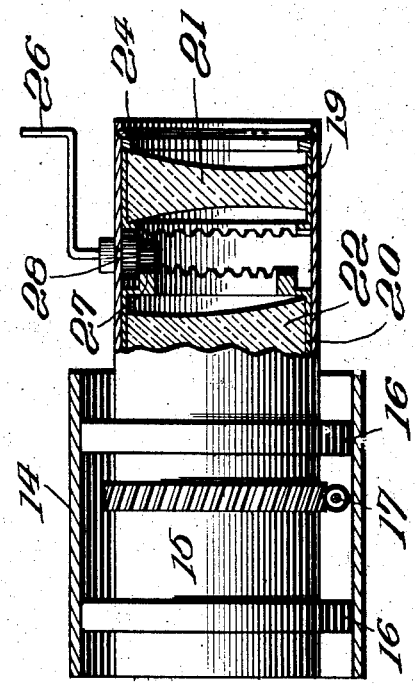
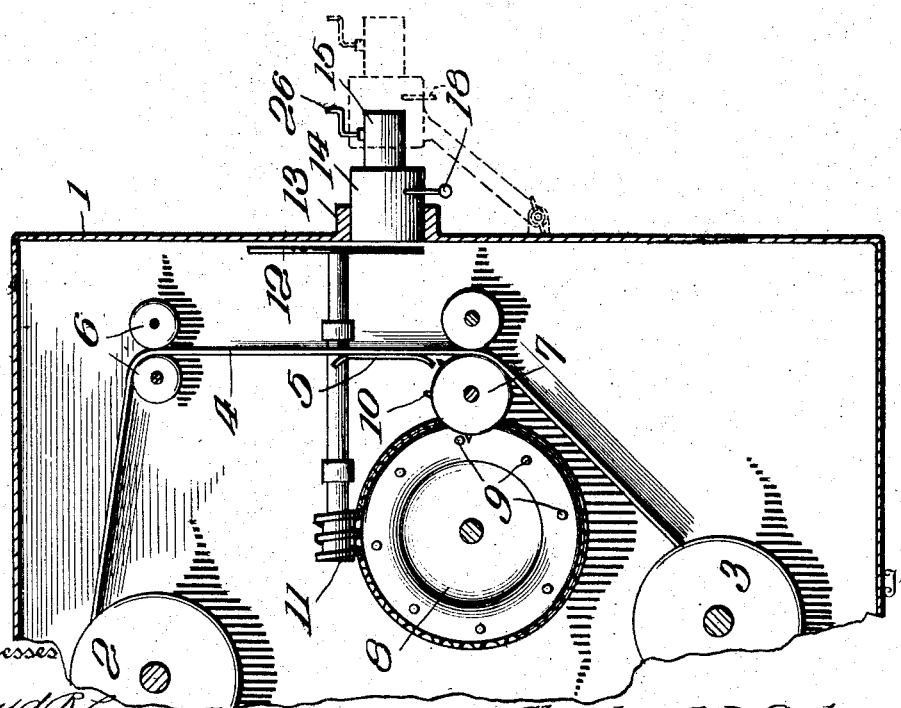

ial scription
UNITED STATES PATENT OFFICE.

CHARLES A. L. GEHRMANN, OF SPRINGFIELD, ILLINOIS.

MOTION-PICTURE APPARATUS.

1,321,906.  Specification of Letters Patent.  Patented Nov. 18, 1919.

Application filed March 16, 1917. Serial No. 155,290.

*To all whom it may concern:*

Be it known that I, CHARLES A. L. GEHRMANN, a citizen of the United States, residing at 327 East Lawrence Ave., Springfield, Illinois, have invented certain new and useful Improvements in Motion-Picture Apparatus, of which the following is a full, clear, and complete specification, reference being had to the accompanying drawings.

The present invention relates to motion picture cameras or projection apparatus, of a type in which a series of images are formed by a lens upon a surface, the surface being either sensitized so as to secure photographic registration of the series of images, or else being of a light reflecting nature so that a large number of people may view the successive images.

In devices of this nature heretofore used, when abnormal or caricature pictures were desired it has often been necessary, either to construct abnormal or special objects to photograph or else to draw each successive image and photograph the same, both of which usually entail great expense.

It is the general object of this invention to provide a simple structure comprising a plurality of lenses which may be used either in connection with motion picture cameras or projection apparatus for the production of abnormal or distorted pictures.

Other objects of the invention will appear as the construction is more fully disclosed.

For the purpose of rendering the invention more clear reference is had to the accompanying drawings, in which Figure 1 shows one form of the invention in structural relation with a motion picture camera. Fig. 2 shows an enlarged sectional view of the device and Fig. 3 a modification thereof. A motion picture camera casing 1 contains the film feed and winding rolls 2 and 3 which feed the film 4 into the optical plane 5 by means of the guide rolls 6 and the feed wheel 7. This feed wheel is driven in the usual manner by a master gear 8 fitted with pins 9 which coöperate with the teeth 10 of the feed roll 7 thereby imparting to the same an intermittent rotation, which motion serves to bring successive portions of the film 4 into the optical plane. The master gear 8, which is rotated by a handle located on the exterior of the camera casing also serves to impart motion to the rotary shutter 12 by means of the worm gearing 11.

Located in the front of the camera in direct alinement with the optical plane is a boss or projection 13 adapted to receive the various lens mountings such as are used in motion picture work. In the device as shown in Fig. 1 and in greater detail in Fig. 2, a cylindrical tube or member 14 has mounted inside of it a second tube 15, the member 15 is carried by the ball bearings 16 and may be rotated relative to the tube 14 by means of the worm gearing 17 actuated by the handle 18. Rotatively mounted upon the interior of the tube 15 are two lens cells 19 and 20 which carry respectively the pair of unsymmetrical lenses 21 and 22, the lens cells being mounted between flanges 23 and 24. The lens cells are adapted to be rotated relative to the tube 15, and in opposite directions relative to each other by means of the gear 25 which meshes with crown gears located on the inner opposing surfaces of the lens cells, the gear 25 being rotated by means of the handle 26.

The unsymmetrical lenses 21 and 22 are identical in form and therefore when they are placed in the position shown in Fig. 2 the distortion produced by the one lens is corrected by the second lens. Any image which is produced by the lenses when in the position shown in Fig. 2 will therefore be normal, but by rotation of the gear 25 by means of the handle 26, the lenses 21 and 22 will be rotated relative to each other and the image produced by the lenses will therefore become distorted, the degree of distortion depending upon the amount of rotation, and reaching a maximum when the lenses are rotated 180 degrees relative to each other from the position shown in Fig. 2. At the same time the axis of distortion does not change as the lenses 21 and 22 are rotated equi-angular distances in opposite directions. The axis of distortion, however, may be rotated by means of the handle 18, which rotates the tube 15, thereby rotating both lenses relative to the optical plane and it, therefore, becomes possible to produce either vertical or horizontal distortion as well as distortion along any intermediate axis. The present apparatus may therefore be used to produce a motion picture of an object or group of objects which at first appear normal but gradually become more and more distorted, and if desired at the same time that the distortion is increasing the angle of distortion may be continuously changed thereby enabling the operator to produce a number of curious and weird effects in the picture.

The modification shown in Fig. 3 comprises the same elements shown in the first modification with the exception that instead of using a single gear 25 for the relative rotation of the lens mount, two gears 27 and 28 of different diameters are used which mesh respectively with the two crown gears of different diameters carried on the inner opposing faces of the two lens cells 19 and 20. In this modification, rotation of the crank 26 will alter the axis of distortion as well as the degree of distortion, and simultaneous manipulation of the crank 18 will at the same time rotate the tube 15 relative to the optical plane. It will be evident that a number of curious effects may therefore be produced at will by the manipulation of the cranks 26 and 18 at various speeds and in the same or reverse directions, and if desirable a gear connection may be used to produce rotation of the lenses from the master gear 8.

As shown in Fig. 1, the lenses 21 and 22 form the objective of the camera, but if desired, the lenses together with their mounting may be pivoted upon a bracket as shown in dotted lines in Fig. 1, and the structure may then be used supplemental to the regular camera objective, being swung into or out of operative position at the will of the operator. It should be understood that any type or combination of lenses could be used, and any number of lenses could be rotatively mounted in the tube 15, my application filed Mar. 16, 1917, and bearing Serial Number 155,289 covering the use of a single rotating distortion lens.

It should be further understood that while my invention as set forth in the drawings is shown in connection with a motion picture camera, that its use is in no way limited to the same as it is evident that a combination of lenses such as have been set forth could be used with motion picture projection apparatus, the distortion lenses being either substituted for, or used supplemental to the projection lens of the projection apparatus.

Claims:

1. In a motion picture apparatus, means for projecting upon a surface a series of images of an object comprising a plurality of unsymmetrical lenses, and means to continuously rotate the lenses relative to each other whereby a variable degree of distortion is produced in the successive images.

2. In a motion picture apparatus, means for projecting upon a surface a series of images of an object comprising a plurality of unsymmetrical lenses, and means to continuously rotate the lenses relative to each other, and relative to said surface, whereby a distortion which continuously changes both in degree and axis is produced in the successive images.

3. In a motion picture camera, the combination with a movable sensitized surface adapted to receive a series of photographic impressions of a plurality of unsymmetrical lenses so located with reference to the plane of the surface as to produce an image thereon, means to successively expose portions of the sensitized surface to the image and means to continuously rotate the unsymmetrical lenses so as to produce a continuous change of distortion in the series of photographic impressions registered upon the surface.

4. In a motion picture camera, the combination with a movable sensitized surface, of an objective lens adapted to produce an image in the plane of said surface, means to move the sensitized surface and to photographically register upon said surface a series of impressions of said image, a plurality of unsymmetrical lenses located in front of the objective lens to produce distortion in the image, and means to rotate the unsymmetrical lenses whereby distortion in the series of impressions registered upon the sensitized surface is continuously changed.

5. In a motion picture apparatus, means for projecting upon a surface a series of images of an object comprising a plurality of unsymmetrical lenses, and means to continuously move the lenses around their common axis and relative to each other whereby a variable degree of distortion is produced in the successive images.

6. In a photographic apparatus, means for projecting upon a surface a series of images of an object comprising a plurality of unsymmetrical lenses, and means to move said lenses relative to each other and relative to said surface between each projection of an image whereby a distortion which changes both in degree and axis is produced in the successive images.

7. In a photographic apparatus, means for projecting upon a surface a series of images of an object comprising a plurality of unsymmetrical lenses, and means to move said lenses around their common axis and relative to each other between the projection of each successive image whereby a distortion which changes in degree is produced in the successive images.

In testimony whereof I have hereunto set my hand.

CHARLES A. L. GEHRMANN.